June 25, 1935. G. J. GIBBS 2,006,135
APPARATUS FOR THE MEASUREMENT BY VOLUME OF DELIVERED QUANTITIES OF LIQUIDS
Filed Dec. 19, 1934
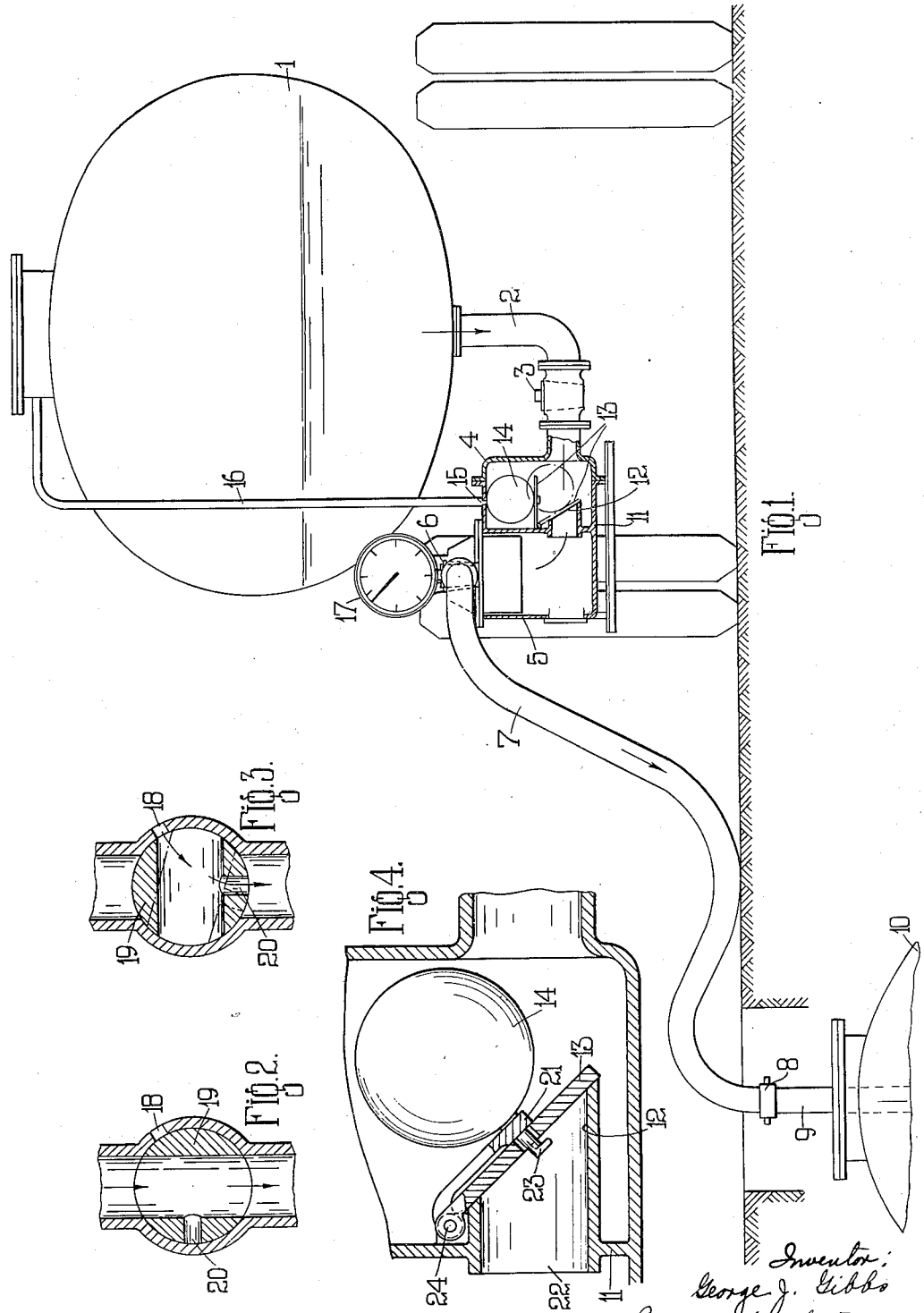

Patented June 25, 1935

2,006,135

UNITED STATES PATENT OFFICE 2,006,135

APPARATUS FOR THE MEASUREMENT BY VOLUME OF DELIVERED QUANTITIES OF LIQUIDS

George James Gibbs, Preston, England

Application December 19, 1934, Serial No. 758,324
In Great Britain October 5, 1933

4 Claims. (Cl. 221—67)

The present invention relates to apparatus for the measurement by volume of delivered quantities of liquids and whilst applicable generally to the measurement of liquids, is of particular use in the measurement of petrol when delivered from a portable tank to the fixed tank of the purchaser.

Generally, garages and other suppliers of petrol have their tanks supplied from a portable tank, the quantity of petrol delivered from the portable tank being measured by a meter in the pipe line between the tanks. As the portable tank is generally above the purchaser's fixed tank it happens that immediately the portable tank is emptied and the last portion of the liquid has passed through the meter, the weight of the liquid still flowing in the pipe between the meter and the purchaser's tank causes air to be drawn through the meter. As a result, false measurement is indicated on the meter. Again, the pipe between the meter and the purchaser's tank on disconnection is often found to be partially or wholly full of petrol with the result that quite apart from the inaccuracy due to the passage of air through the meter, the purchaser is debited with a greater volume of petrol than has actually been received in his tank.

The object of the present invention is to overcome this difficulty as regards inaccuracy of measurement and accordingly the conduit between the portable tank and the fixed tank is provided on the inlet side of the meter with a valve controllable by the level of liquid in an auxiliary chamber of the pipe line.

The invention is more particularly described with reference to the accompanying drawing in which:—

Figure 1 is an end elevation partly in section showing a tank wagon with the device fitted thereto.

Figure 2 and 3 are sectional elevations of a control cock in two different positions.

Figure 4 is a fragmentary sectional view of a modified form of construction.

The tank 1 of a tank wagon of any usual form having an outlet pipe 2 which may be provided with a stop cock 3 has connected thereto a chamber 4 to the outlet of which a metering device 5 of any desired form is applied. Fluid flowing from the metering device passes through stop cock 6 to a flexible hose connection 7 adapted to be connected by a union 8 to the inlet pipe 9 of a storage tank 10.

The chamber 4 is divided by a partition 11 into a float chamber and a liquid retaining chamber.

The partition 11 has a passage provided with a valve seat 12 co-operating with a pivoted valve member 13 connected to a float 14. An air release port 15 is connected by a stand pipe 16 to some point on the tank above the highest liquid level.

The metering device 5 may be provided with an indicator 17 of any usual form.

It will be preferred that the stop cock 6 has a small air inlet port 18 and its plug 19 has an air passage 20 so that when sufficient liquid has passed from tank 1 through the metering device 5 into tank 10 and it is then desired to disconnect the flexible pipe 7 from the metering device, the cock 6 on the chamber 4 is turned off into the position shown in Figure 3, so that air can then enter the pipe 7 prior to or during the uncoupling of the union between pipe 7 and chamber 4 to allow of the fluid in the pipe 7 flowing into the tank 10 and thus avoiding waste.

It will consequently be seen that with the device according to the present invention as long as liquid is either flowing through chamber 4 or is present therein above a predetermined level, the valve 13 will be open, but should the supply of liquid fail, that is to say, the tank 1 become empty, no flow of air can pass through to operate the metering device 5 and give a false reading on the indicator 17 because the float valve 14 will automatically close.

Figure 4 shows a modified form of construction which is designed to obviate the possibility that excessive liquid pressure in the chamber 4 acting on the upper surface of the valve 13 may prevent the float 14 from lifting the valve 13.

In this construction the float 14 is attached directly to a pilot valve 21 which is adapted to close an aperture in the valve 13 and which is pivoted about the same axis 24 as the valve 13.

It will be appreciated that opening of the pilot valve 21 will allow liquid to pass into the space 22 to equalize the pressures on both faces of the valve 13.

The pilot valve 22 carries an extension piece or hook member 23 adapted to engage the back of the valve 13 to open it, after the pilot valve has opened by a predetermined amount, so as to provide for unobstructed flow of liquid to the meter.

I declare that what I claim is:—

1. Apparatus for the measurement by volume of quantities of liquid delivered from a high level reservoir to a low level receptacle, comprising means for providing a float chamber and a liquid retaining chamber communicating therewith, a conduit connecting a low point of said reservoir with said float chamber, a meter communicating with said retaining chamber, valve means for closing communication between said float chamber and said retaining chamber when the liquid in said float chamber falls below a predetermined level whereby to prevent the passage of air to said meter, a float responsive to the liquid level in said float chamber for opening said valve means, said valve means including a pilot valve connected to said float whereby to assure the opening of said valve means upon the rising of the liquid level in said float chamber, an air escape conduit extending from the upper part of said float chamber to a point above the maximum liquid level in said reservoir whereby air can escape from said float chamber to a point above the maximum liquid level in said reservoir so that liquid from the reservoir can fill completely said float chamber, and a discharge conduit connected to said meter for delivering the liquid to the receptacle.

2. Apparatus for the measurement by volume of quantities of liquid delivered from a high level reservoir to a low level receptacle, comprising means for providing a float chamber and a liquid retaining chamber communicating therewith, a conduit connecting a low point of said reservoir with said float chamber, a meter communicating with said retaining chamber, a valve for closing communication between said float chamber and said retaining chamber when the liquid in said float chamber falls below a predetermined level whereby to prevent the passage of air to said meter, a float responsive to the liquid level in said float chamber for opening said valve, an air escape conduit extending from the upper part of said float chamber to a point above the maximum liquid level in said reservoir whereby liquid from the reservoir can fill said float chamber, a discharge conduit connected to said meter for delivering the liquid to said receptacle, and valve means for closing communication from said meter to said discharge conduit whereby to maintain the filled condition of said retaining chamber, said valve means including an air bleeder to permit drainage of said discharge conduit when said valve means is closed.

3. Apparatus for the measurement by volume of quantities of liquid delivered from a high level reservoir to a low level receptacle, comprising means for providing a float chamber and a liquid retaining chamber communicating therewith, a conduit connecting a low point of said reservoir with said float chamber, a meter communicating with said retaining chamber, a pivoted valve for closing communication between said float chamber and said retaining chamber when the liquid in said float chamber falls below a predetermined level whereby to prevent the passage of air to said meter, a float connected to said valve at a point removed from its pivot point and responsive to the liquid level in said float chamber for opening said valve, an air escape conduit extending from the upper part of said float chamber to a point above the maximum liquid level in said reservoir whereby liquid from the reservoir can fill said float chamber, and a discharge conduit connected to said meter for delivering the liquid to said receptacle.

4. Apparatus for measurement by volume of quantities of liquid delivered from a high level reservoir into a low level receptacle, comprising means for providing a float chamber and a liquid retaining chamber communicating therewith, a conduit connecting a low point of said reservoir with said float chamber, a meter communicating with the top of said retaining chamber, pivoted valve means for closing communication between said float chamber and said retaining chamber when the liquid in said float chamber falls below a predetermined level whereby to prevent the passage of air to said meter, said valve means including a valve plate and a pilot valve having a common pivot point, a float connected to said pilot valve and responsive to the liquid level in said float chamber for opening said valve means, an air escape conduit extending from the upper part of said float chamber to a point above the maximum liquid level in said reservoir whereby liquid from the reservoir can fill said float chamber, and a discharge conduit connected to said meter for delivering the liquid to the receptacle.

GEORGE JAMES GIBBS.